United States Patent
Riedel et al.

(10) Patent No.: US 8,978,515 B2
(45) Date of Patent: Mar. 17, 2015

(54) TRANSMISSION HEATING AND STORAGE DEVICE

(75) Inventors: Paulo A Riedel, Braganca Paulista (BR); Renato Freitas Silva, Santo André (BR)

(73) Assignee: GM Global Technology Operations, LLC, Detroit, MI (US)

(*) Notice: Subject to any disclaimer, the term of this patent is extended or adjusted under 35 U.S.C. 154(b) by 1247 days.

(21) Appl. No.: 12/728,751

(22) Filed: Mar. 22, 2010

(65) Prior Publication Data
US 2011/0226089 A1    Sep. 22, 2011

(51) Int. Cl.
| F01P 11/02 | (2006.01) |
| F16H 57/02 | (2012.01) |
| F16H 57/04 | (2010.01) |
| F16H 61/00 | (2006.01) |

(52) U.S. Cl.
CPC ........ F16H 57/0413 (2013.01); F16H 57/0494 (2013.01)
USPC ...................... 74/606 A; 123/41.14; 74/606 R

(58) Field of Classification Search
USPC ........... 74/606 A, 606 R; 123/41.14, 196 AB, 123/142.5 R; 165/104.11, 104.14, 104.21, 165/104.25, 10
See application file for complete search history.

(56) References Cited

U.S. PATENT DOCUMENTS

| 4,393,922 | A | * | 7/1983 | Bahrle et al. .................... 165/41 |
| 4,616,609 | A | * | 10/1986 | Munch et al. ........... 123/196 AB |
| 5,662,007 | A | * | 9/1997 | Starker et al. ............... 74/606 A |
| 5,678,461 | A | * | 10/1997 | Stine ........................... 74/606 A |
| 5,749,329 | A | * | 5/1998 | Thurfjell .................... 123/41.14 |
| 6,021,868 | A | * | 2/2000 | Bogema ..................... 184/104.3 |
| 6,217,758 | B1 | * | 4/2001 | Lee .......................... 210/167.06 |
| 6,401,870 | B2 | * | 6/2002 | Roy et al. ..................... 184/6.26 |
| 6,899,074 | B1 | * | 5/2005 | Carlsson ................. 123/196 AB |
| 7,036,634 | B2 | * | 5/2006 | Wheeler ...................... 184/6.22 |
| 7,037,091 | B2 | * | 5/2006 | Chumley et al. .............. 417/572 |
| 2005/0167079 | A1 | * | 8/2005 | Zhang ............................. 165/10 |
| 2008/0135006 | A1 | * | 6/2008 | Shikida .................. 123/142.5 R |
| 2009/0192685 | A1 | * | 7/2009 | Sime ............................... 701/60 |
| 2010/0126437 | A1 | * | 5/2010 | Riedel et al. ............... 123/41.14 |
| 2011/0226089 | A1 | * | 9/2011 | Riedel et al. ................ 74/606 A |

FOREIGN PATENT DOCUMENTS

DE    102004015050 A1    10/2005

* cited by examiner

Primary Examiner — Justin Krause

(57) ABSTRACT

A heat storage and release system for a transmission includes a material capable of super cooling within an operating temperature range of the transmission. The material is in thermal communication with the transmission. An energy input device is associated with the material and operable to input energy to the material to initiate an exothermic phase change within the material in order to deliver heat to the transmission.

6 Claims, 3 Drawing Sheets

TRANSMISSION HEATING AND STORAGE DEVICE

TECHNICAL FIELD

The invention relates to a heating and storage device for a transmission, and more particularly to a heating device that warms-up hydraulic fluid within the transmission from a cold start and stores heat from the hydraulic fluid after the cold start.

BACKGROUND

A typical multi-speed transmission uses a combination of torque transmitting devices, such as, for example, clutches, brakes, and/or dog clutches/synchronizers, to achieve a plurality of forward and reverse gear ratios. Individual torque transmitting devices are actuated by a hydraulic control system that converts electrical commands from a transmission controller to mechanical movement via a hydraulic fluid. The temperature of the hydraulic fluid impacts the effort required to shift or actuate the torque transmitting devices. For example, cold hydraulic fluid has a higher viscosity and therefore increased drag resistance. During a cold start, i.e. starting the operation of the transmission after the transmission has been sitting idle for some length of time, the hydraulic fluid has a lower temperature than a temperature of the hydraulic fluid during normal operating conditions. As the transmission continues to operate from the cold start, the temperature of the hydraulic fluid increases to a final operating temperature. Accordingly, it is desirable to reduce the length of time of the warm-up phase so as to improve shiftability and efficiency of the transmission from a cold start. Thus, there is a need in the art for a system for heating the hydraulic fluid of the transmission from a cold start in order to reduce the amount of time for the hydraulic fluid to reach a normal operating temperature.

SUMMARY

A heat and storage system for heating hydraulic fluid within a transmission is provided. The system may include a material capable of being super cooled within the operating temperature range of the transmission. The material is in thermal communication with the transmission. The system also includes an energy input device associated with the material. The energy input device delivers energy to the super cooled material sufficient to initiate an exothermic phase change. During the phase change the material releases heat to the hydraulic fluid of the transmission.

In one example of the system, the material is located within a housing disposed within the sump of the transmission.

In another example of the system, the material is sodium acetate.

In yet another example of the system, the energy input device is operable to mechanically disturb the material in order to initiate the exothermic phase change.

In yet another example of the system, the material absorbs heat from the hydraulic fluid once the hydraulic fluid is at a steady-state operating temperature.

Further objects, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
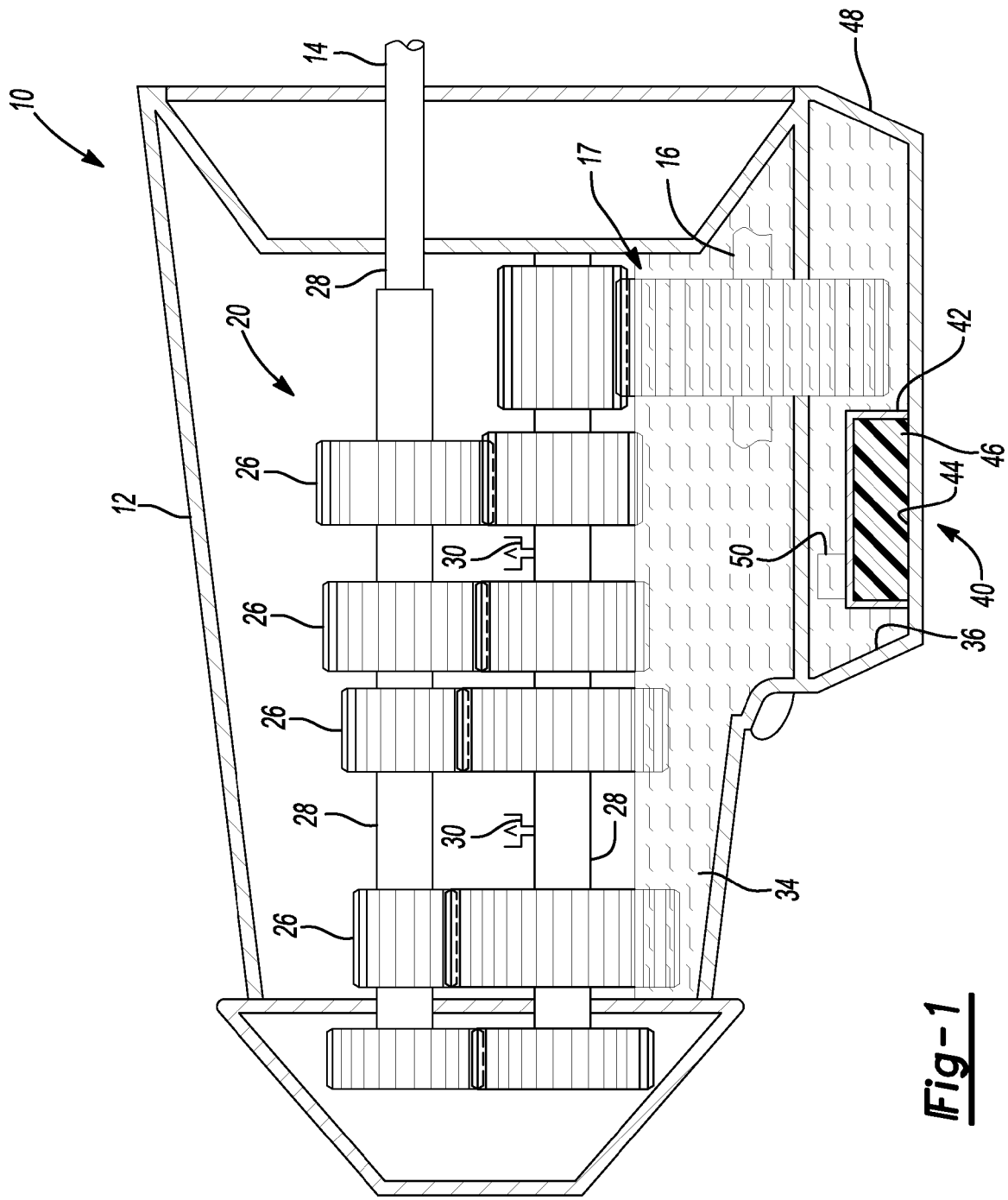
FIG. 1 is a schematic diagram of an exemplary transmission having a heating system in a first mode of operation according to the principles of the present invention.

With reference to FIG. 1, an exemplary manual transmission incorporating the present invention is illustrated and generally designated by the reference number 10. The transmission 10 includes a typically cast, metal housing 12 which encloses and protects the various components of the transmission 10. The housing 12 includes a variety of apertures, passageways, shoulders and flanges which position and support these components. While the transmission 10 is illustrated as front wheel drive transmission, it should be appreciated that the transmission 10 may be any type of transmission, such as a hybrid transmission or a rear wheel drive transmission, without departing from the scope of the present invention. The transmission 10 includes an input shaft 14, an output shaft 16, and a gear arrangement 20. The input shaft 14 is connected with a prime mover (not shown) such as an internal combustion gas or Diesel engine or a hybrid power plant. The input shaft 14 receives input torque or power from the prime mover. The output shaft 16 is preferably connected with a final drive unit 17. The input shaft 14 is coupled to and drives the gear arrangement 20.

The gear arrangement 20 includes a plurality of gear sets, indicated generally by reference number 26, and a plurality of shafts, indicated generally by reference number 28. The plurality of gear sets 26 includes individual intermeshing gears that are connected to or selectively connectable to the plurality of shafts 28. The plurality of shafts 28 may include layshafts, countershafts, sleeve and center shafts, reverse or idle shafts, or combinations thereof. It should be appreciated that the specific arrangement and number of the gear sets 26 and the specific arrangement and number of the shafts 28 within the transmission 10 may vary without departing from the scope of the present invention. The plurality of gear sets 26 are selectively connectable to the plurality of shafts by a plurality of torque transmitting devices 30. In the example provided, the torque transmitting devices are synchronizer assemblies, but it should be appreciated that the torque transmitting devices 30 may take any form without departing from the scope of the present invention.

The transmission also includes a hydraulic control system that uses a hydraulic fluid 34 to actuate, lubricate, and cool the carious components of the transmission 10. The hydraulic fluid 34 is stored in a sump 36 of the transmission 10. The sump 36 is a tank or reservoir preferably disposed at the bottom of the transmission housing 12 to which the hydraulic fluid 34 returns and collects from various components and regions of the transmission 10. The hydraulic fluid 34 is stored in the sump 36, as shown in FIG. 1, when the transmission 10 is inoperative.

The transmission 10 includes a fluid heating and storage system 40. The fluid heating system 40 is operable to absorb heat from the hydraulic fluid 34 and to subsequently release the absorbed heat to the hydraulic fluid during a cold start condition. The fluid heating system 40 includes a housing or other structure 42 that defines a cavity 44. A heat storage material 46 is disposed within the cavity 44. The housing 42 is in thermal communication with the hydraulic fluid 34. In the example provided, the housing 42 is disposed within the sump 36 and is submerged within the hydraulic fluid 34. The housing 42 may be connected mechanically (e.g., fastened, welded or otherwise connected) to a front differential cover 48 that forms a bottom of the sump 36. However, it should be appreciated that the housing 42 may be connected in other locations within the transmission 10 so long as the housing 42 is in thermal communication with the hydraulic fluid 34 during a cold start event. It should be appreciated that the housing 42 may also be formed during casting of the transmission housing 12 or front differential cover 48 or may be subsequently machined therein.

The cavity 44 may comprise any suitable shape and/or size for holding a sufficient quantity of heat storage material 46. In the example provided, the cavity 44 is symmetrically shaped as a cylinder to facilitate machining during production. In another configuration, the cavity 44 may be asymmetrically shaped. Asymmetrical configurations may be particularly advantageous where the cavity 44 is cast into the front differential cover 48.

The heat storage material 46 is capable of the absorption, storage and release of heat. The material is in thermal communication with the hydraulic fluid 34. Generally, the heat storage material 46 is configured to absorb heat generated by the transmission 10 during operation of the transmission 10. Thereafter, as the transmission 10 cools the heat storage material 46 retains at least a portion of the stored energy for later release, particularly during a subsequent start-up of the transmission 10. When additional heat is desired for the transmission 10, the heat storage material 46 is caused to release the stored heat to the transmission 10.

For example, during operation of the transmission 10, the heat storage material 46 absorbs heat generated by the transmission 10 causing the material to exist in a first physical state (e.g., liquid). The heat storage material 46 remains super cooled in its first physical state after operation of the transmission 10 has been discontinued and the transmission 10 has cooled to ambient temperatures. Prior to, or during, a subsequent start-up of the transmission 10, the heat storage material is caused to change to a second physical state (e.g., solid) wherein heat is released, generally in a steady-state manner, during and after transition of the heat storage material 46 from the super cooled liquid state to the solid state. The release of heat lowers the heating time of the hydraulic fluid 34, thereby providing improved shiftability, performance and efficiency.

In one embodiment, the heat storage material 46 exists in a liquid physical state at or above its melting temperature and exists in a liquid or a solid physical state at or below its freezing temperature. When the heat storage material 46 exists as a liquid below its freezing point, the heat storage material 46 is commonly referred to as being super cooled or, in a super cooled state. In this super cooled state, the heat storage material 46 requires additional energy to transform from a liquid state to a solid state (i.e., cause crystallization of the heat storage material 46).

The operating temperature of the transmission 10 ranges from the cold start temperature of the transmission 10 to a steady state operating temperature of the transmission 10. While the cold start temperature of the transmission 10 will vary seasonally and regionally, the steady state operating temperature will be somewhat constant. It should be appreciated that the steady state operating temperature may vary by transmission make, model, and operating conditions such as temperature and load. In general though, the operating temperature of the transmission 10 is generally between about 80 degrees Celsius to 110 degrees Celsius with a maximum of about 130 degrees Celsius. As such, the heat storage material 46 is also capable of super cooling within that range.

The quantity of heat storage material 46 located within the cavity 44 is dependent upon the quantity of heat desired for the transmission 10. It should be appreciated that the more heat storage material 46 placed within the cavity 44 the more potential heat is available for delivery to the hydraulic fluid 34 of the transmission 10. Accordingly, the quantity of heat storage material 46 may be based upon, or proportional to, the transmission size and/or heating requirements.

Suitable heat storage materials 46 include any material capable of storing heat across the operating temperature range of an transmission 10. In one exemplary embodiment, the heat storage material 46 is capable of existing in a super cooled state within the operating temperature range of the transmission 10. Such suitable heat storage materials include materials having a melting temperature below the steady state operating temperature of the transmission 10 and a freezing temperature above a cold start temperature of the transmission 10. Further, the suitable materials will release heat (i.e. change phases from a super cooled liquid to a solid) at a temperature above the cold start temperature of the transmission 10. As such, the suitable material melts during an operational temperature of the transmission 10 and is super cooled below steady state operational temperatures of the transmission 10. When the super cooled material undergoes a phase change, the hydraulic fluid 34 within the transmission 10 is heated due to the release of heat by the heat storage material 46.

Examples of suitable heat storage materials 46 include sodium acetate, sodium ethanaote, disodium hydrogen phosphate dodecahydrate, and the like. In one particular example, the heat storage material 46 comprises a sodium salt of an acetic acid, such as sodium acetate. Sodium acetate comprises a material capable of relatively easily existing in more than one physical state within a given temperature range. For example, sodium acetate has a melting temperature above about 95° C. and a solidification, or freezing temperature of about 54° C. However, due to the inherent characteristics of sodium acetate, it can exist in a liquid phase at temperatures notably below 54° C., including ambient temperatures commonly encountered by transmissions 10.

In order to initiate solidification of super cooled liquid sodium acetate the sodium acetate must be sufficiently activated or disturbed. Accordingly, the fluid heating system 10 further includes an energy input device or trigger 50. The trigger 50 may be in communication with an engine controller, a sensor associated with the ignition of the vehicle, an entry handle of the vehicle, or any other input that is indicative of a desire to start the vehicle. The trigger 50 may be mechanical in function and may be located inside or outside of the housing 42. The trigger 50 operates to deliver mechanical energy sufficient to initiate the liquid to solid phase change in the heat storage material 46. Such mechanical energy may be in the form of waves initiated through percussion, vibration or otherwise. It should be appreciated that various configurations may be used for the generation of waves or other mechanical energy to the heat storage material 46. For example, in one configuration a moveable member may be provided that is configured to strike the housing 42 containing the heat storage material 46 thereby transmitting energy waves through the heat storage material 46 and initiating a phase change therein. Such movable members may comprise a pin, hammer, or other suitable percussion member and may move through the use of a solenoid (electrically driven, pneumatically driven or otherwise). In another configuration, the trigger 50 is configured to move the housing 42 with sufficient force to cause disturbance and initiate the phase change of the heat storage material 46. However, it should be appreciated that the trigger 50 may take various other forms without departing from the scope of the present invention.

Figure 2:
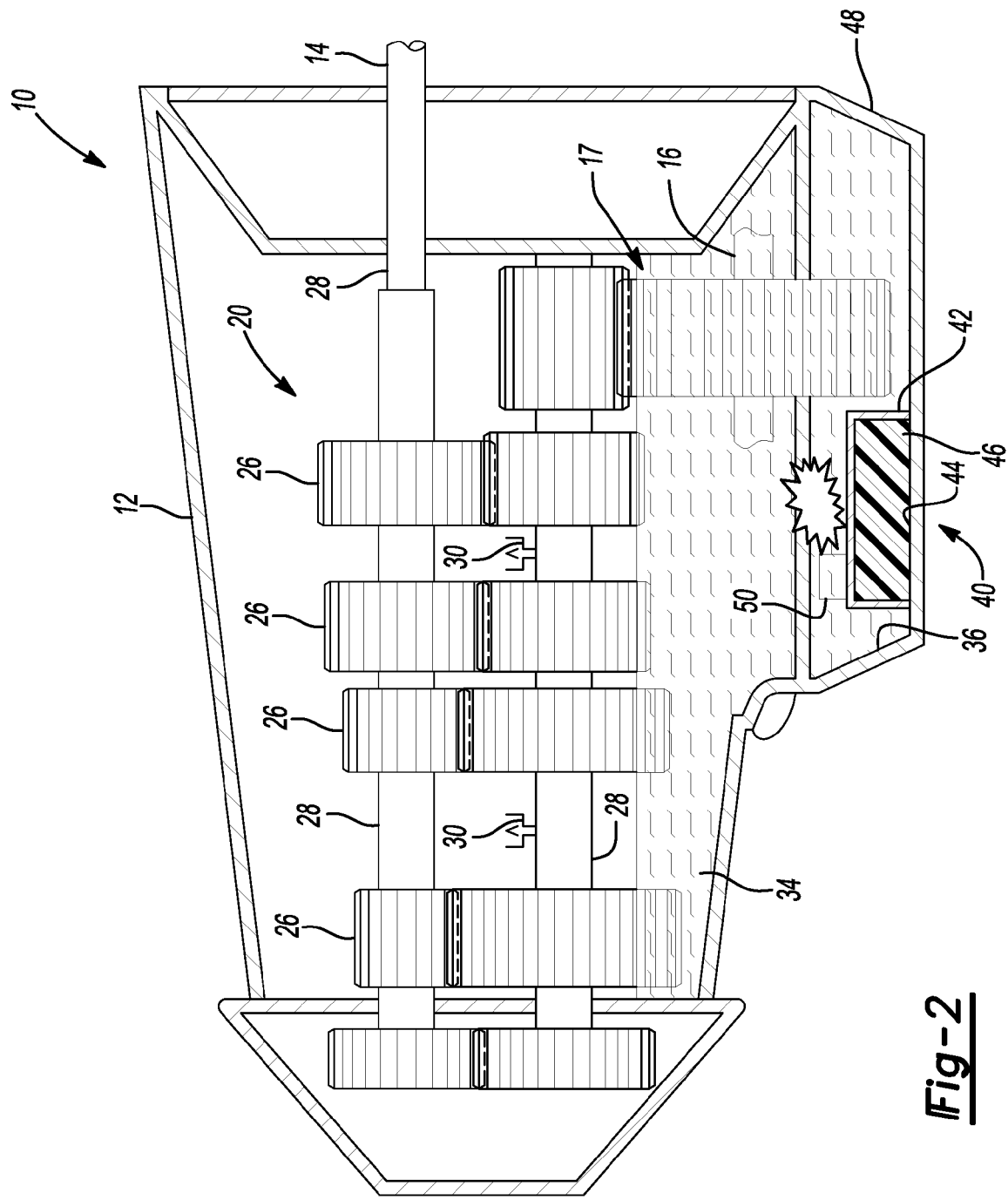
FIG. 2 is a schematic diagram of an exemplary transmission having a heating system in a second mode of operation according to the principles of the present invention.
Figure 3:
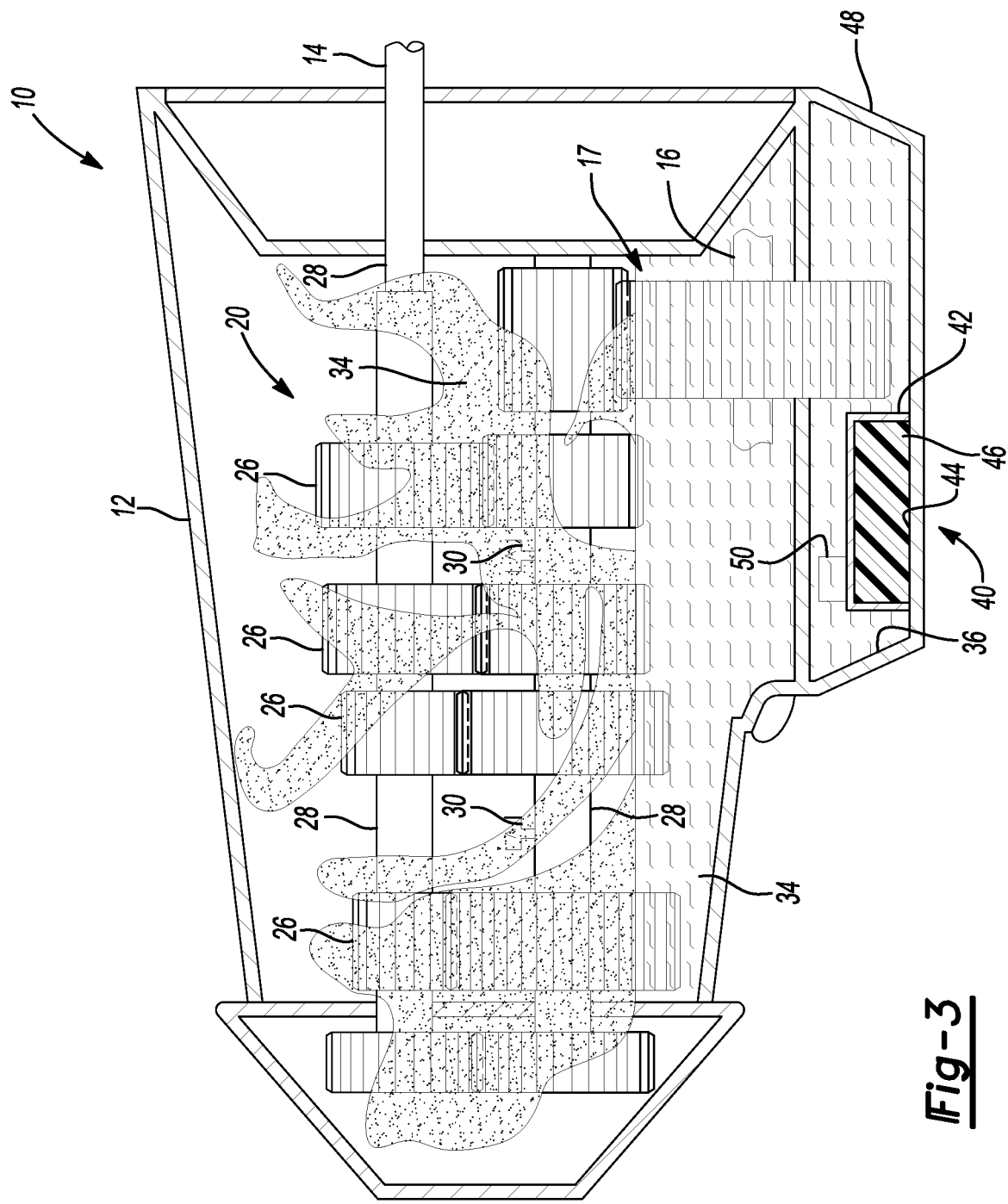
FIG. 3 is a schematic diagram of an exemplary transmission having a heating system in a third mode of operation according to the principles of the present invention.

Turning to FIG. 2, an example of the operation of the fluid heating system 40 using sodium acetate as the heat storage material 46 will be described. During a cold start condition, the hydraulic fluid 34 is settled within the transmission 10, the fluid heating system 40 is submerged, and the sodium acetate is in a liquid state. To initiate a warm up of the hydraulic fluid 34, the trigger 50 is activated. Upon disturbance by the trigger 50, the sodium acetate transforms from a first physical state (super cooled liquid) to a second physical state (solid). During this exothermic phase change, the sodium acetate heats to a temperature of about 54° C. This phase change results in the release of heat causing the hydraulic fluid 34 to be heated. With reference to FIG. 3, as the various components within transmission 10 begin to move, the pre-heated hydraulic fluid 34 is distributed throughout the transmission 10 and therefore the addition of heat via operation of the transmission 10 is additive to the heat provided by the fluid heating system 40. At any time when the temperature of the transmission 10 is greater than the temperature of the heat storage material 46, the heat storage material 46 absorbs heat generated by the transmission 10. During heat absorption, the solid heat storage material 46 undergoes a physical phase change back to the liquid state. Upon termination of the transmission 10 operation and cooling of the transmission 10 to ambient temperatures, the heat storage material 46 enters a super cooled, liquid state. In this state the material 46 is again ready to release stored energy, in the form of heat, to the transmission 10 upon subsequent operation of the fluid heating system 40. It should be appreciated that the fluid heating system 40 may be regenerated, as described, through the life of the vehicle without replenishment of the fluid heating system 40.

It should be appreciated that the transmission 10 may include more than one fluid heating system 40, each of which may function to provide simultaneous heating, sequential heating or other heating solutions. For example, in one configuration it is contemplated that one or more fluid heating systems 40 may be located within the sump 36. These fluid heating systems 40 may extend along all or a portion of the length or width of the sump 36 or at various depths. It should be appreciated that different configurations are available for obtaining a desired heating result.

The trigger 50 may be activated at different times and through different activation devices either automatically due to environmental conditions or via an electronic command. For example, the trigger 50 may be activated during an operation of the transmission 10, during non-operation of the transmission 10, or both. In one exemplary embodiment, the trigger 50 is activated prior to ignition of an engine (not shown) associated with the transmission 10. For example, the trigger 50 may be associated with a suitable controller for activation of the energy input device during approach of an operator to the vehicle, during unlocking of a vehicle door, upon placement in, or rotation of, a key in an ignition system of the engine, or otherwise. In another configuration, the trigger 50 is activated during start-up of the engine. This may be through a controller or through the natural vibration of the engine or transmission 10 during starting. In still another exemplary embodiment, the trigger 50 may be activated after initial ignition of the engine or after initial rotation of the components of the transmission 10. In one configuration, the trigger 50 is activated by a remote device, such as a remote keyless entry fob of a vehicle. In configurations where more than one trigger 50 is used, it is contemplated that the triggers 50 may be activated simultaneously or at different times, such as sequentially or otherwise. However, in all conditions, the transmission 10 must operate to re-energize or store heat in the fluid heating system 40.

The description of the invention is merely exemplary in nature and variations that do not depart from the general essence of the invention are intended to be within the scope of the invention. Such variations are not to be regarded as a departure from the spirit and scope of the invention.

The following is claimed:

1. A transmission comprising:
 a transmission control module;
 an input shaft;
 an output shaft;
 a gear arrangement connected between the input shaft and the output shaft for providing a plurality of speed ratios between the input shaft and the output shaft;
 a transmission case enclosing the gear arrangement;
 a sump located at a bottom of the transmission case;
 a hydraulic fluid disposed within the sump; and
 a heat storage and release system submerged within the hydraulic fluid, the heat storage and release system comprising:
 a housing that defines a cavity, wherein the housing is connected to a bottom surface of the sump;
 a material disposed within the housing capable of storing and releasing heat, wherein the material is in thermal communication with the hydraulic fluid through the housing; and
 an energy input device electrically coupled to the transmission control module and associated with the material and operable to input energy to the material when electrically activated by the transmission control module to initiate an exothermic phase change within the material in order to deliver heat to the hydraulic fluid.

2. The transmission of claim 1 wherein the exothermic phase change is from a super cooled, liquid state to a solid state of the material.

3. The transmission of claim 1 wherein the material is further configured to absorb heat generated by the hydraulic fluid to thereby undergo a phase change from the solid state to a liquid state.

4. The transmission of claim 1 wherein the material comprises sodium acetate or sodium ethanaote.

5. The system of claim 1 wherein the energy input device comprises a mechanical input device configured to input mechanical energy to the material suitable for initiating the exothermic phase change.

6. A transmission comprising:
 a transmission control module;
 an input shaft;
 an output shaft;
 a gear arrangement connected between the input shaft and the output shaft for providing a plurality of speed ratios between the input shaft and the output shaft;
 a transmission case enclosing the gear arrangement;
 a sump located at a bottom of the transmission case;
 a hydraulic fluid disposed within the sump; and
 a heat storage and release system completely submerged within the hydraulic fluid, the heat storage and release system comprising:
 a housing that defines a cavity, wherein the housing is connected to an absolute bottom surface of the sump;
 a material disposed within the housing capable of storing and releasing heat, wherein the material is in thermal communication with the hydraulic fluid through the housing; and an energy input device associated with the material and operable to input energy to the material to initiate an exothermic phase change within the material in order to deliver heat to the hydraulic fluid, wherein the energy input device is connected to the transmission control module.

* * * * *